(12) United States Patent
Kim

(10) Patent No.: US 7,131,681 B2
(45) Date of Patent: Nov. 7, 2006

(54) TRUCK SPACE STORAGE PLATFORM

(75) Inventor: Won-Tai Kim, Macomb, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/741,781

(22) Filed: Dec. 19, 2003

(65) Prior Publication Data

US 2005/0134075 A1    Jun. 23, 2005

(51) Int. Cl.
*B60N 3/12* (2006.01)
*B60R 7/00* (2006.01)

(52) U.S. Cl. ............... 296/37.16; 224/539; 224/548; 224/564; 108/44

(58) Field of Classification Search ............ 296/37.16, 296/37.1; 224/539, 544, 542, 545, 548, 554, 224/564; 108/44
See application file for complete search history.

(56) References Cited

U.S. PATENT DOCUMENTS

| | | | | |
|---|---|---|---|---|
| 1,855,245 A * | 4/1932 | Kuenzel | ............... | 248/423 |
| 2,094,401 A * | 9/1937 | Girl | ............... | 414/462 |
| 3,162,416 A * | 12/1964 | Amarillas | ............... | 248/244 |
| 5,483,902 A * | 1/1996 | Grosch | ............... | 108/143 |
| 5,669,537 A | 9/1997 | Saleem et al. | | |
| 5,895,020 A * | 4/1999 | Danzyger et al. | ...... | 248/295.11 |
| 5,954,408 A * | 9/1999 | Bogucki | ............... | 312/223.3 |
| 6,042,203 A * | 3/2000 | Bogucki | ............... | 312/223.3 |
| 6,062,146 A * | 5/2000 | Conners et al. | ............... | 108/44 |
| 6,068,319 A * | 5/2000 | O'Brien | ............... | 296/37.6 |
| 6,092,708 A * | 7/2000 | Rand | ............... | 224/542 |
| 6,176,535 B1 * | 1/2001 | Chaloult et al. | ......... | 296/37.16 |
| 6,290,277 B1 | 9/2001 | Spykerman et al. | | |
| 6,375,055 B1 | 4/2002 | Spykerman et al. | | |
| 6,546,598 B1 * | 4/2003 | Nakanou et al. | ............ | 224/281 |
| 6,733,060 B1 * | 5/2004 | Pavkov et al. | .......... | 296/37.16 |
| 2002/0179663 A1 | 12/2002 | Moore et al. | | |
| 2003/0090120 A1 | 5/2003 | Barber et al. | | |
| 2003/0222475 A1 * | 12/2003 | Nakamitsu et al. | ...... | 296/37.16 |

\* cited by examiner

*Primary Examiner*—Joseph D. Pape
(74) *Attorney, Agent, or Firm*—Bill Panagos

(57) ABSTRACT

A trunk space storage platform for motor vehicles comprises and right support with at least one slot, a left support with at least on slot, a base, and at least one support stud. This trunk space storage platform allows users who cannot easily bend over to pick up or place objects into deep trunk spaces, such as the elderly or those with physical impairments, to raise or lower the base to a level more easily accessible for them depending on the articles stored in the trunk space of the motor vehicle.

6 Claims, 1 Drawing Sheet

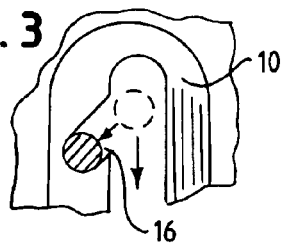
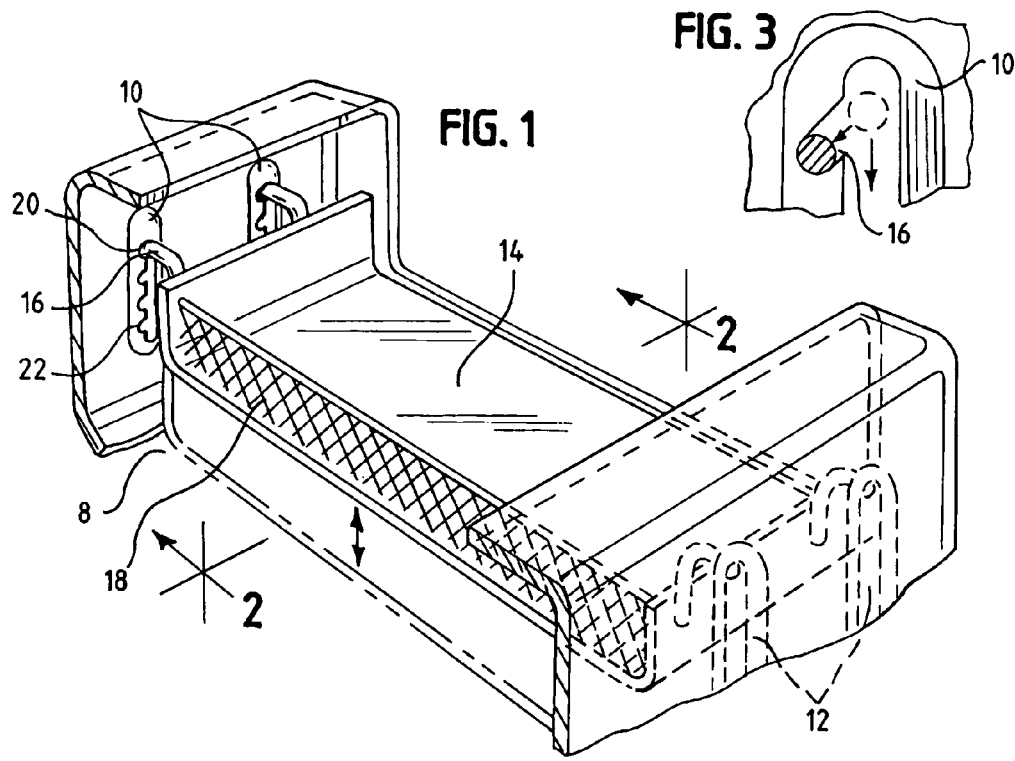
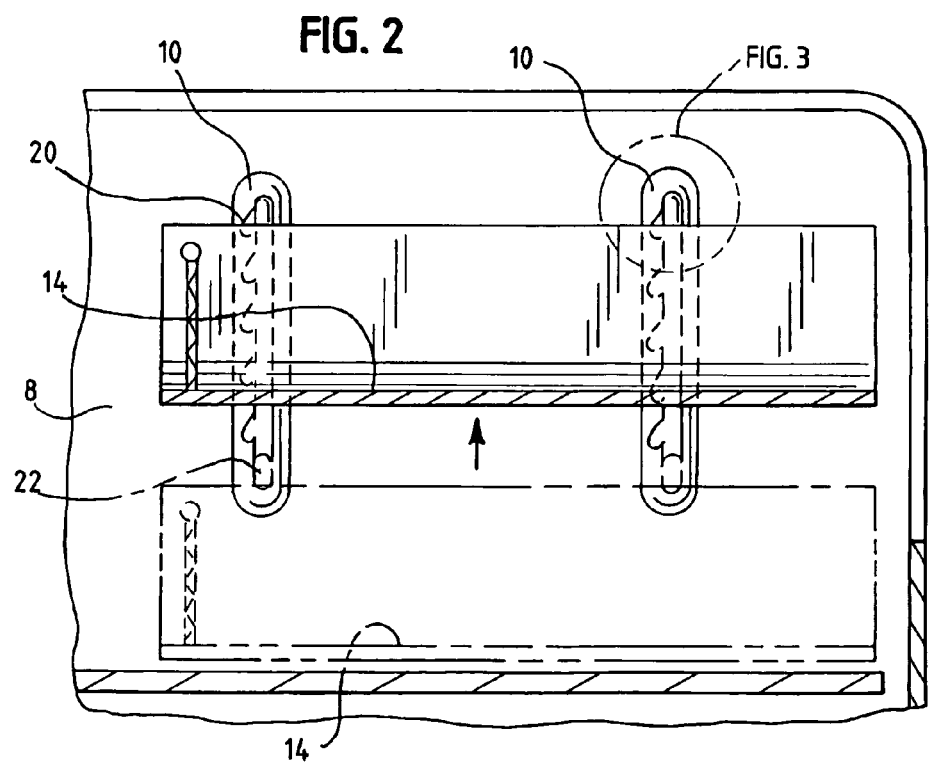

TRUCK SPACE STORAGE PLATFORM

FIELD OF INVENTION

This invention relates to trunk space in a motor vehicle. More specifically, it relates to an adjustable platform for the trunk space floor in a motor vehicle.

BACKGROUND OF INVENTION

In motor vehicles, the trunk space is the place where drivers and their passengers store personal belongings so that the passenger area of the motor vehicle can be used more comfortably. As a result, there is a high demand for more trunk space in motor vehicles. Many manufacturers have met this demand by making trunk space deeper into the motor vehicle. Many drivers and their passengers have enjoyed this deeper trunk space with no problems. However, some drivers and/or passengers are either elderly or have certain physical disabilities that make it difficult for them to bend that far over to reach into the now deeper trunk space. As a result, there has been a demand to help solve this problem. Trunk space systems have been developed to hold objects in place so that they do not roll back into the trunk space. There are also trunk space systems that contain/organize objects in the trunk space. However, these systems do not eliminate the bending action that is necessary to retrieve objects from the trunk space.

U.S. Pat. No. 5,669,537 (Saleem et al.) attempted to help solve this problem. This patent relates to a storage area for motor vehicles with a portable storage unit. However, this portable storage unit is cumbersome. Those users with physical impairments may find it difficult to maneuver this invention. With so many parts, installing/removing or repairing this portable storage unit may be time consuming and costly.

Users simply want a an easy to use and lightweight device in order to assist them in accessing their trunk space and the objects they place in it with little or no hassle.

This invention solves this problem by providing a lightweight adjustable platform covering a portion of the trunk space floor. This platform can be raised or lowered as the user desires. For those who have difficulty bending over into the deeper trunk space, the platform allows storage at a more accessible level. Additionally, there are no bulky parts; just a simple, streamlined platform that is easy to maneuver. This device simply fastens to its supports in one movement with no twisting, turning, or sliding motions. Since there are so few parts, installation/removal and repair costs are kept low.

SUMMARY OF INVENTION

Accordingly, this trunk space storage platform comprises a right support with at least one slot, a left support with at least one slot, a base, and at least one support stud. The base comprises at least one support stud on each the right and left end, those support studs then fit into the slots in the right and left supports. The right and left supports have slots at varying heights, allowing the base to be raised or lowered to any desired height. The base comprises of at least one side wall for containment of one's personal belongings. The base, right support, left support, at least one support stud, and at least one side wall all comprise of a lightweight material. The right support and left support may be either fixed or removable from the interior of the trunk space walls.

DETAILED DESCRIPTION OF THE DRAWINGS

FIG. 1 is a view of the trunk space storage platform as it would be seen in the trunk space of a motor vehicle.

FIG. 2 is an inside view of the varying positions the trunk space platform can be placed in.

FIG. 3 is a detailed view of the support stud in the right support.

DETAILED DESCRIPTION OF THE PREFERRED EMBODIMENT

To help certain occupants of a motor vehicle more easily access the trunk space 8 of their motor vehicle, this trunk space storage platform comprises a right support 10, a left support 12, a base 14, and at least one support stud 16. In the trunk space 8, the right support 10 and the left support 12 are located in either a fixed or a removable position within the trunk space 8. The right support 10 and the left support 12 each have at least one slot. In its preferred embodiment, there will be at least one high slot 20 in both the right support 10 and the left support 12. Also in its preferred embodiment, there will be at least one low slot 22 in each the right support 10 and the left support 12. The high slot 20 and the low slot 22 provide for the adjustable heights. It is possible to have more slots in each the right support 10 and the left support 12 to allow the user more possible heights. The base 14 fastens between the left support 12 and the right support 10.

In its preferred embodiment, the base 14 comprises at least one support stud 16 on its right side and one on its left side. The support stud 16 on the left will fasten into either the high slot 20 or low slot 22 of the left support, depending on the height the user desires for the base 14. The support stud 16 on the right will fasten into either the high slot 20 or the low slot 22 of the right support 12, depending on the height the user desires for the base 14. This invention is most properly used when support studs 16 are in either all in the high slot 20 or low slot 22 of the right support 10 and left support 12. This is so that the base 14 remains level at all times.

The base 14 further comprises a side wall 18 to contain articles utilizing this invention. Without the side wall 18, it is possible that articles on the base 14 would fall off and into the trunk space 8 making it difficult for a user to access those articles.

The right support 10, left support 12, base 14, side wall 18, and support studs 16 all comprise of a lightweight material in its preferred embodiment. Since many users of this invention may be elderly or suffer from a physical impairment, it is ideal to use a lightweight easy to lift or lower material. If the material of these parts was too heavy, these user would not be able to effectively utilize this invention.

The above presents a description of the best mode contemplated for carrying out this invention. The claims should not be read as limited to the described order or elements unless stated to that effect. Therefore, all embodiments that come with the scope and spirit of the following claims and equivalents thereto are claimed as the invention.

What is claimed is:

1. A storage platform for a trunk space having walls in a motor vehicle comprising:
    at least four supports, each of said supports including a slot having a substantially vertical height adjustment section defined therein and a plurality of support sections, each of said support sections extend linearly away from said height adjustment section at a predetermined angle and substantially parallel relative to each other;

a base including a platform and a plurality of sidewalls extending away from said platform, wherein said platform and said sidewalls cooperate to define a cavity having a top access substantially above said platform and a side access substantially between at least two of said sidewalls; and at least four support studs mounted to said base and each of said support studs disposed within one of said slots, wherein height of said base within the trunk space can be adjusted by moving said support studs through said height adjustment sections and can be fixed at various heights by positioning said support studs within said support sections while said support stud remains disposed within said slot.

2. The storage platform as in claim 1, wherein said base, said supports and said support studs comprise a lightweight material.

3. The storage platform as in claim 1, wherein said supports include a right support and a left support, wherein said support studs include at least one support stud mounted to a right end of said base and at least one support stud mounted to a left end of said base, said support stud mounted to said right end of said base adapted to be positioned within said at least one slot of said right support and said support stud mounted to said left end of said base adapted to be positioned within said at least one slot of said left support.

4. The storage platform as in claim 1, wherein said supports are fixed into at least one of the walls of the trunk space.

5. The storage platform as in claim 1, wherein said supports are removably attached to at least one of the walls of the trunk space.

6. The storage platform as in claim 1, wherein said sidewalls comprise a lightweight material.

* * * * *